Aug. 16, 1938.  A. A. MORRELL  2,127,042
GAUGE ROD
Filed Jan. 15, 1937
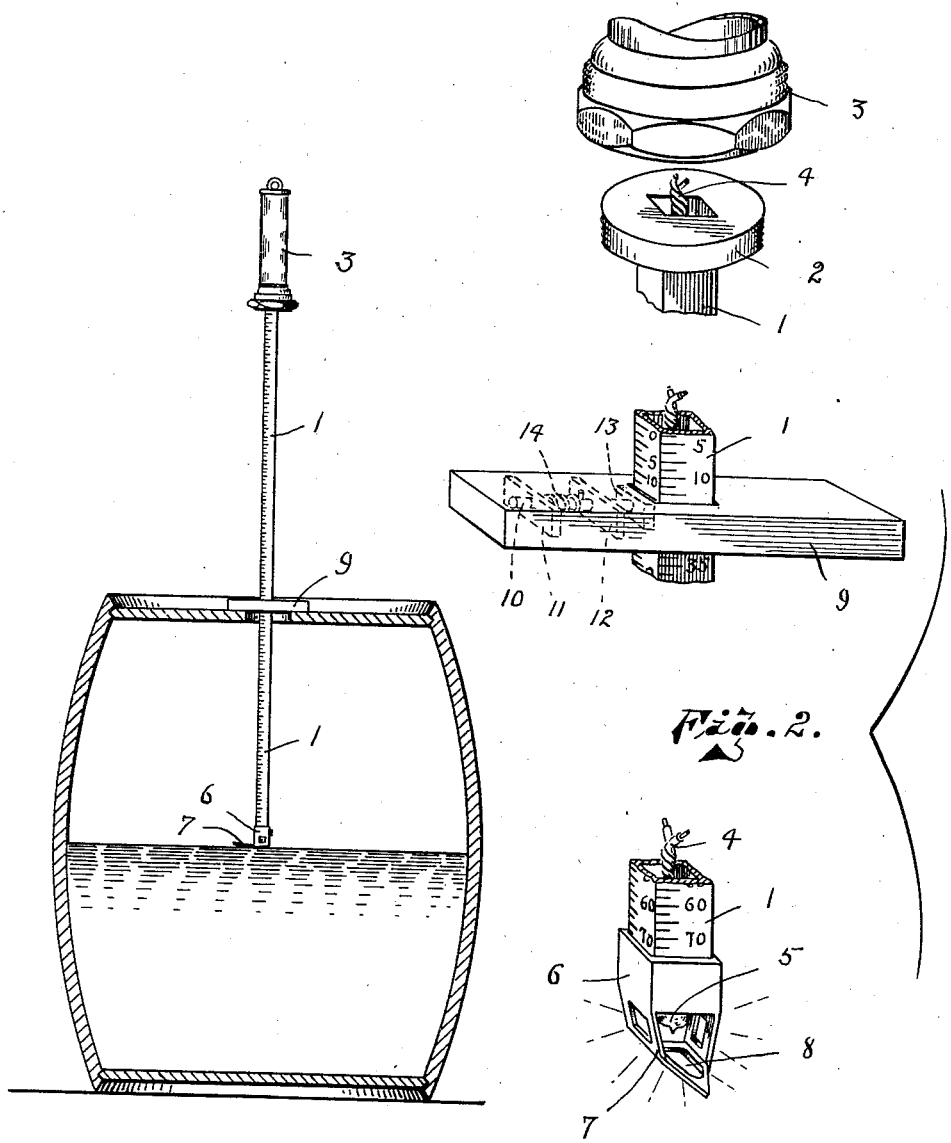
INVENTOR.
Alton A. Morrell
BY
Geo. Stevens
ATTORNEY.

Patented Aug. 16, 1938

2,127,042

UNITED STATES PATENT OFFICE 2,127,042

GAUGE ROD

Alton A. Morrell, Chippewa Falls, Wis.

Application January 15, 1937, Serial No. 120,770

1 Claim. (Cl. 33—126)

This invention relates to instruments for determining the contents of receptacles, and has special reference to portable measuring devices of this character, the principal object being to provide a more convenient, simple and dependable instrument of this type.

Another object is to provide such a device which may be conveniently used for the inspection of the interior of a receptacle.

Other objects and advantages of the invention will appear in the following description thereof.

Referring now to the accompanying drawing, forming part of this application, and wherein like reference characters indicate like parts:

Figure 1 is a central vertical sectional view of a barrel like container with one of the measuring rods inserted therein for determining the contents of the container.

Figure 2 is an enlarged fragmental perspective view of one of the rods.

In the drawing the numeral 1 represents a hollow gauge rod or stem, preferably square in cross section, and upon the four sides of which may be a plurality of graduations or scales as shown. These graduations are previously determined and positioned to properly indicate the contents of a container of a predetermined size, such for example as in the lubricating oil trade as whole resale or half resale barrels, whole steel or half steel equipment barrels, or the like, each of which is more or less of a standard container in such trade. Or, as is obvious these scales may indicate measurements pertaining to containers of different sizes.

The upper end of the gauge rod is provided with an externally screw threaded disc like member 2 for the reception of a common flashlight 3, the electric terminals of which are extended by suitable wires 4 into the rod and downwardly therethrough to the lowermost end thereof where the rod is provided with a suitable socketed plug for the external reception of a light bulb such as is commonly used in connection with a flash light, such bulb being indicated at 5.

About this terminal of the rod and removably attached in any desired manner is a sleeve like housing 6, two opposite walls of which extend downwardly and converge somewhat, each having an opening therein, and their lower ends support the inverted visor like member 7 through which a hole 8 is formed intermediate of the converging side walls and with the opposed areas of the visor opposite to said converging walls being open to permit of light extending therethrough as well as through the openings in the converging walls and the hole 8 in the member 7. Thus when the rod is inserted within a container otherwise practically void of light, the globe 5 when luminated by closing the circuit on the handle portion of the flash light will illuminate the interior of the receptacle as well as the surface of the contents of the receptacle so that no occasion exists for the thrusting of the lower end of the rod into the contents of the container, yet permitting of delicate adjustment of the rod to the exact surface thereof and thereby determining the depth of the space within the container above the contents thereof by use of the proper scale on the rod applicable to such container. This is accomplished by first sliding the cross member or finder 9 down on the rod so that it will be in engagement with the upper surface of the top of the container while the rod is lowered to the surface of the contents therein, when the proper scale on the rod is read.

This finder 9 is frictionally held against the rod 1 as for example by a horizontally disposed plunger 10 mounted within two cross bars 11 and 12 and carrying upon its innermost end a suitably faced shoe 13 for engagement against the rod, the facing preferably being of felt or the like to not injure the scale of the rod, and the plunger 10 being biased towards the rod at all times by a suitable expansive helical spring 14.

It will be noted that in the manipulation of the gauge rod within the container through any suitable hole provided therefore, it may be first positioned before the finder 9 is slid to its measuring position, thus not interfering in any manner with the vision through the hole, as is obvious.

Also it will be apparent that the gauge rod may be formed of any number of sides, either square, hexagonal or octagonal and thus provide surfaces for a larger number of scale graduations for other sizes and types of containers.

Having thus described my invention, what I claim and desire to secure by Letters Patent, is:

A portable hollow gauge rod having a scale area longitudinally thereof for indicating the contents of a container, a battery within one end of said rod, a lamp and socket therefore in the other end, wires connecting the battery and lamp for optionally illuminating the latter, a housing secured to the lower end of said rod and enclosing and protecting the lamp, said housing having openings through all four sides and bottom thereof, and said bottom being formed with an extension laterally in one direction for convenience in ascertaining when said bottom contacts the surface of said contents.

ALTON A. MORRELL.